United States Patent [19]

Hollick et al.

[11] Patent Number: 4,934,338
[45] Date of Patent: Jun. 19, 1990

[54] METHOD AND APPARATUS FOR PREHEATING VENTILATION AIR FOR A BUILDING

[75] Inventors: John C. Hollick, Maple, Canada; Rolf W. Peter, Zurich, Switzerland

[73] Assignee: Solarwall International Limited, St. Peter Port, Channel Islands

[21] Appl. No.: 444,768

[22] Filed: Dec. 1, 1989

Related U.S. Application Data

[62] Division of Ser. No. 302,359, Jan. 27, 1989, Pat. No. 4,899,728.

[51] Int. Cl.⁵ .................................................. F24J 2/00
[52] U.S. Cl. ................................. 126/428; 126/450; 126/432
[58] Field of Search ............... 126/428, 429, 450, 431, 126/432; 136/246

[56] References Cited

U.S. PATENT DOCUMENTS 4,126,270  11/1978  Hummel .............................. 126/428
4,471,761   9/1984  Pearson et al. ...................... 126/449
4,774,932  10/1988  Hollick .............................. 126/428

FOREIGN PATENT DOCUMENTS 1196825  11/1985  Canada .

OTHER PUBLICATIONS

PCT International Application, Mar. 20, 1980; Inventors, Grossin et al., 24 pages.

*Primary Examiner*—Carroll B. Dority
*Attorney, Agent, or Firm*—Shoemaker and Mattare, Ltd.

[57] ABSTRACT

Ventilation air for a building is preheated by providing on a south-facing wall a solar-energy absorbent collector panel with a plurality of air-inlet openings which communicate with air collection channels behind the panel. Outside air passing upwardly along the panel is heated by the heat of the panel which itself is heated by a combination of solar radiation and heat being lost from the interior of the building. The outside air, passing upwardly a short distance along the panel to the closest air inlet opening, is withdrawn therethrough into the air collection channel and expelled into the interior of the building.

10 Claims, 5 Drawing Sheets

# METHOD AND APPARATUS FOR PREHEATING VENTILATION AIR FOR A BUILDING

This is a divisional of U.S. patent application Ser. No. 302,359, filed on Jan. 27, 1989 and now U.S. Pat. No. 4,899,728.

This invention relates generally to a method and apparatus for controlling the entry of ventilation air into a building, and preheating the air with solar energy and recovered building losses.

BACKGROUND OF THIS INVENTION

Commercial, industrial, domestic and apartment buildings require ventilation, and it is common for the natural leakage around doors, wall-ceiling joints, etc. found in standard building construction to allow sufficient air to enter the building. A pressure drop from the exterior to the interior of the building can arise from many factors, such as high winds, exhaust fans and combustion air for fuel-burning furnaces. This tends to draw outside air into the building through any crack or opening.

The problem with the conventional approach is that the amount of ventilation air is not controlled, the temperature in the building near the outside walls is lower than average and less comfortable, and additional heat must be provided to heat the outside air to room temperature during the heating season.

This problem has typically been solved by installing gas, oil or electric heaters and air-moving fans to heat the incoming air. When solar panels are used to heat a building, air is recirculated from the building through the collector and back. During the heating season, the ambient temperature is lower than the room temperature, and therefore a recirculating solar collector operates at a much reduced efficiency level.

One of us has disclosed two methods and apparatus which avoid using consumable energy, like oil, to heat incoming air for a building. Instead of simply recirculating interior air from the building through a solar collector and back to the building, fresh make-up air for ventilation purposes is introduced into the building after first passing the air through a solar collector located on a south-facing wall of the building. In Canadian Patent No. 1,196,825, issued Nov. 19, 1985, the solar collector consists of glazing over a darkened wall. In U.S. Pat. No. 4,774,932, issued Oct. 4, 1988, the solar collector consists of a darkened collector panel with corrugations running vertically, and collecting means for withdrawing the heated air from vertical grooves near the top of the panel.

The latter method is less expensive for accomplishing the same goal. Its efficiency in collecting the total heat created by the solar radiation in the collector panel can be reduced in some locations or on sloped walls. The air rising in the grooves heats up, becomes lighter and moves faster, and its initially laminar flow may turn into turbulent flow, mixing with cold air and losing heat to the outside. The taller the solar panel is, the more intensively the sun heats the panel, and the stronger a wind blows. The heat loss grows with the height of the panel as its temperature is highest at the top. This loss is aggravated if the panel does not have a selective coating.

GENERAL DESCRIPTION OF THIS INVENTION

We now have devised a new method and apparatus for accomplishing the desired goal at low cost and without the above efficiency limitations for high panels.

More specifically, this invention provides a method of preheating ventilation air for a building having a south facing surface through which heat from the interior of the building escapes, the method comprising the steps:

(a) providing on the south-facing surface of the building a solar radiation-absorbent collector panel defining an air collection space between itself and said surface, and having, distributed over the panel and its bottom end, a plurality of air inlet openings communicating with the air collection space;

(b) heating outside air with solar heat from the collector panel and with heat being lost from the interior of the building, and passing the heated air upwardly in laminar flow along the panel; and (c) withdrawing heated outside air through the air inlet openings of the collector panel and into the air collection space behind the panel, using air-moving means having an inlet at the top of the air collection space and having an outlet within the interior of the building.

Various embodiments of the method utilize expanded metal sheet as the panel with the air inlet openings being constituted by slits in the expanded metal, or the panel is constructed as a plurality of substantially identical and overlapping sub-panels with the air inlet openings being formed by spaced left open between the overlapping sub-panels, or the area of the air inlet openings per unit collector panel area increases with increasing distance from the air-moving means, or the air collection space is sub-divided by suitable walls into a plurality of parallel channels.

Further this invention provides apparatus for preheating ventilation air for a building having a south-facing surface through which heat from the interior of the building escapes, comprising:

a sunlight-absorbent collector panel on the south facing surface, the panel defining an air collection space between itself and the surface, the panel being provided with a plurality of air inlet openings distributed over the panel and its bottom end, and communicating with said space between panel and wall, and air-moving means having at the top of the panel an inlet which communicates with the air collection space between panel and wall for receiving air that has been heated during upward passage and drawn in through the plurality of air inlet openings, and having an outlet within the interior of the building.

Various embodiments of the apparatus utilize expanded metal sheet as the panel with the air inlet openings being constituted by slits in the expanded metal, or the panel is constructed as a plurality of substantially identical and overlapping sub-panels with the air inlet openings being formed by spaced left open between the overlapping sub-panels, or the area of the air inlet openings per unit collector panel area increases with increasing distance from the air-moving means, or the air collection space is sub-divided by suitable walls into a plurality of parallel channels.

GENERAL DESCRIPTION OF THE DRAWINGS

Several embodiments of this invention are illustrated in the accompanying drawings, in which like numerals denote like parts throughout the several views, and in which:

FIG. 6 is a vertical sectional view through a further embodiment of this invention utilizing identical overlapping tiles and heated air flow to the air inlet openings;

FIG. 6a is a vertical sectional view, to a larger scale, of a portion of the embodiment shown in FIG. 6;

FIG. 6b is an elevational view of the portion shown in FIG. 6a; and

DETAILED DESCRIPTION OF THE DRAWINGS

Figure 1:
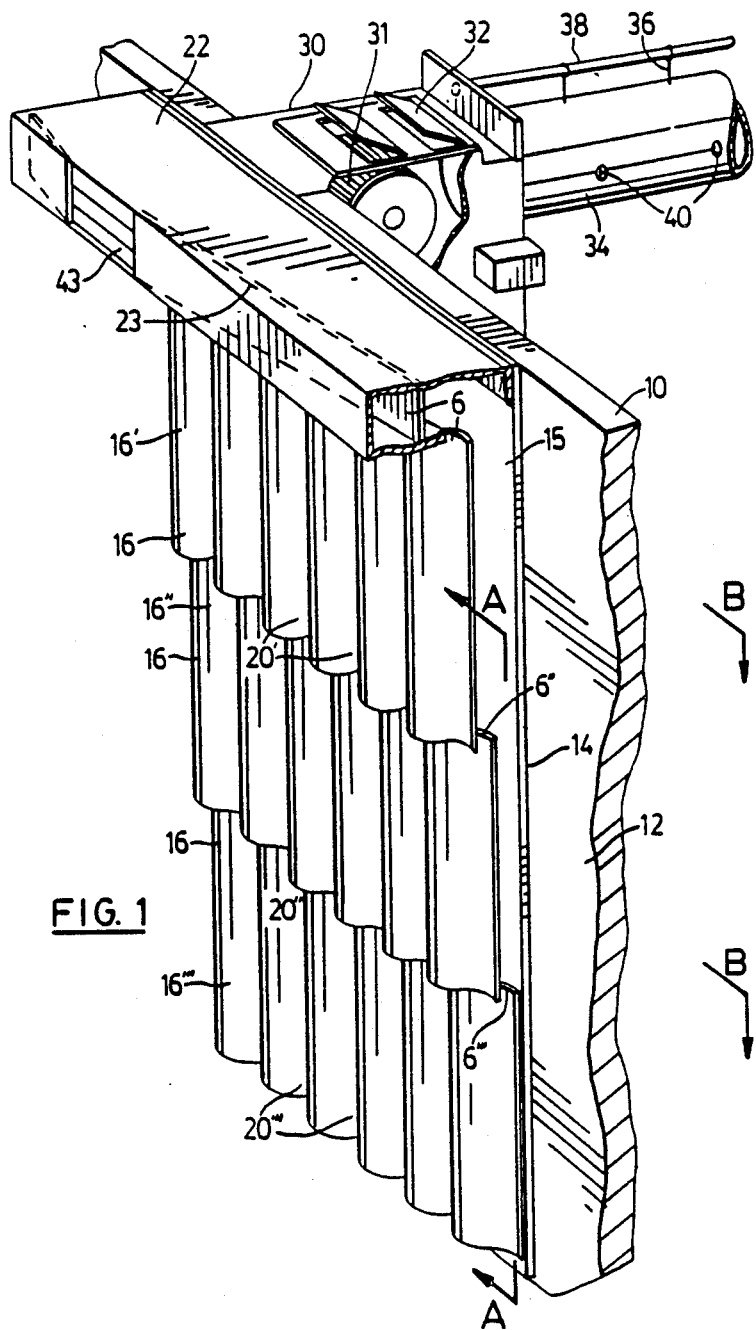
FIG. 1 is a perspective view of a make-up or ventilation air system for a building constructed in accordance with one embodiment of this invention.

Attention is first directed to FIG. 1 which shows a partly broken-away perspective view of a system for carrying out the present invention. A building wall is shown in part at 10 in the Figure, this being typically a block-and-brick composite structure. As with all building walls, even those well-insulated, a steady heat loss is experienced through the wall when the outside temperature is below the inside temperature.

The wall 10 has an outer surface 12 to which is affixed a mounting plate 14. Secured to the mounting plate 14 are a number of corrugated sub-panels 16', 16", 16''', etc. together constituting the collector panel 16 which is coated on the outside with a solar radiation absorbing material, such as dark paint.

Far more desirable than dark paint would be a "selective coating" with high absorption for solar radiation and little infra-red heat emission at temperatures occurring at the collector panel on a sunny day, to keep total energy losses low.

In this embodiment of the invention, as previously mentioned, the panel 16 is composed of a number of overlapping corrugated sub-panels 16', 16", etc. From the top downwardly, they are spaced from the mounting plate 14 at decreasing distances leaving openings 6", 6''' etc. between the sub-panels, which serve as air inlet openings through which the heated outside air enters an air collection space 15.

The air collection space 15 is defined between and by the collector panels 16 and the mounting plate 14, and in turn communicates with a plenum 22 at the top end of the panel 16. The cross-section of the plenum 22 can be made to widen toward a fan housing 30 by adjusting the position of a separator wall 23 such that substantially equal amounts of air are gathered along the length of the plenum 22 from different regions of the air collection space 15. The fan housing 30 contains a conventional fan or air impeller 31 and includes motorized dampers 32 which can be adjusted to allow air from the interior of the building to be mixed with heated air coming from the plenum 22.

Communicating with the housing 30 is a fabric air duct 34 which is preferably flame retardant and made of polyfabric, the duct 34 being suspended by a plurality of duct hangers 36 from a suitably strung support wire or rod 38. The air duct has a plurality of openings 40 through which the heated outside air can pass into the building. By appropriately sizing the openings 40, the air can enter the interior of the building as a high velocity air jet, thus promoting good mixing with the air in the building and minimizing stratification.

It is preferred that the duct 34 be located at the ceiling level for the sake of convenience in industrial and commercial buildings. Other levels and routings for the duct 34 may be chosen in apartment buildings.

The fan within the housing 30 would typically be sized to meet the ventilation requirements and eliminate any negative pressure in the building. A positive pressure can be achieved with outside air entering the building through the fan 31, the air being heated by solar heat, recovered building heat loss, and stratified heat found near a high ceiling. Air can leave the building through cracks and other openings where previously air had entered.

It will be noted that the plenum 22 overhangs the corrugated panel 16. When the sun stands high in the sky, this arrangement reduces overheating the air. Alternatively, the plenum 22 can be provided with a by-pass damper 43 which can be opened when heated air is not required.

It will further be appreciated that the outside air which is heated e.g. by corrugated panel 16", will pass upwardly as a well-defined laminar stream along the grooves 20" and will be drawn through the inlet openings 6" into the air collection space 15 well before either turbulence or wind can disturb the laminar hot-air stream to the point where heat could be lost.

Assuming for the moment that there were no inlet openings 6", 6''', and that the panel 16 were very high, then the laminar air streams would heat up further and would rise faster and faster until the well-defined laminar flow would turn turbulent, and would widen and heat up more outside air. This would mean that part of the heat would not be recovered.

In constructions according to this invention, turbulent flow can be prevented, even in windy conditions, if the distance between inlet openings 6', 6" and 6''' is chosen to be sufficiently short. The more closely the inlet openings 6 are spaced, e.g. the smaller the sub-panel height h in FIG. 1, the smaller is the possibility of heat being lost under adverse conditions, such as the existence of a wind.

Figure 2:
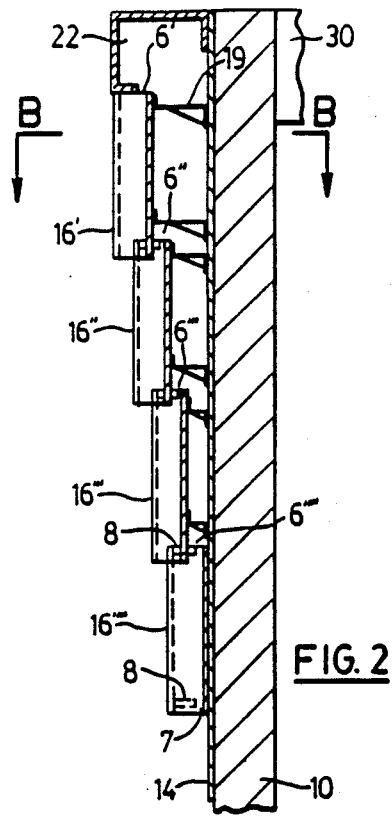
FIG. 2 is a vertical sectional view taken at the line A—A in FIG. 1.
Figure 2A:
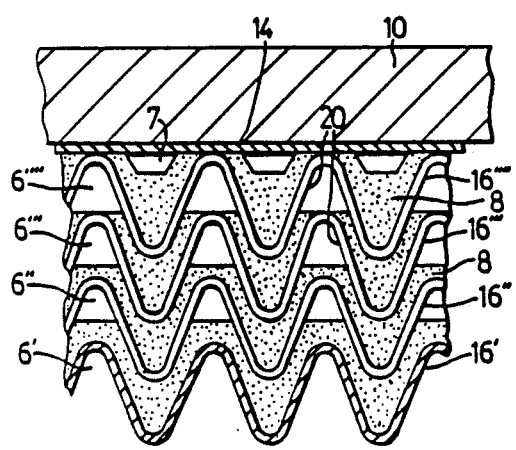
FIG. 2a is a horizontal sectional view taken at the line B—B in FIG. 2.

FIG. 2 is a vertical sectional view of a variant of FIG. 1 at the line A—A and FIG. 2a shows a horizontal sectional view of the structure of FIG. 2 at the line B—B. In FIG. 2 there is a fourth tier of sub-panels identified by the numeral 6''''. Both Figures indicate that the openings 6', 6'', etc. are placed at the inner portion of each groove 20', 20'', etc. by closing off the remainder of the space between overlapping panels, through the insertion of baffles 8 and by positioning the lower plate of plenum 22 so as to leave opening 6'. The sub-panel 16'''' is open at the bottom as seen at 7 in FIG. 2.

Figure 3:
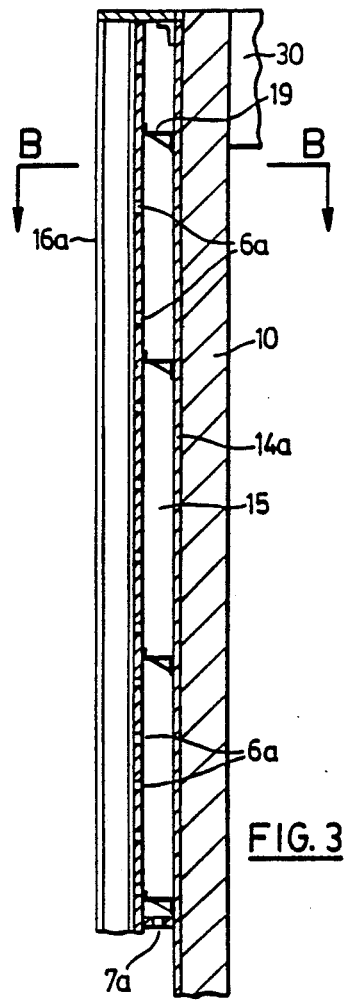
FIG. 3 is a vertical section through a second embodiment of this invention.
Figure 3A:
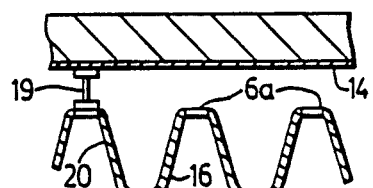
FIG. 3a is a horizontal sectional view taken at the line B—B in FIG. 3.

FIG. 3 is a vertical sectional view, similar to FIG. 2, of another embodiment of the invention. With supports 19, a corrugated collector panel 16a is fastened to a wall-mounting plate 14a, at a uniform distance from the bottom to the plenum 22. Equal sized inlet holes 6a are provided at the inner portion of the grooves 20 as is more clearly seen in FIG. 3a. The latter is a horizontal sectional view of the structure of FIG. 3 taken at line B—B. In order to ensure a uniform intake of heated air to the air collection space 15 per unit panel area, the holes 6a near the panel top are spaced more widely apart than the holes 6a near the bottom of the panel 16. There are also holes 7a at the bottom.

It may be noted that equally spaced holes with decreasing diameters toward the panel top would be an alternative way to achieve the same goal of uniform air intake across the collector panel 16.

It should be noted further that the method disclosed permits the construction of collector panels whose surface temperature is the same across the panel. It alternatively permits the construction of panels with increasing or decreasing temperature in any direction or any portion of the panel.

Figure 4:
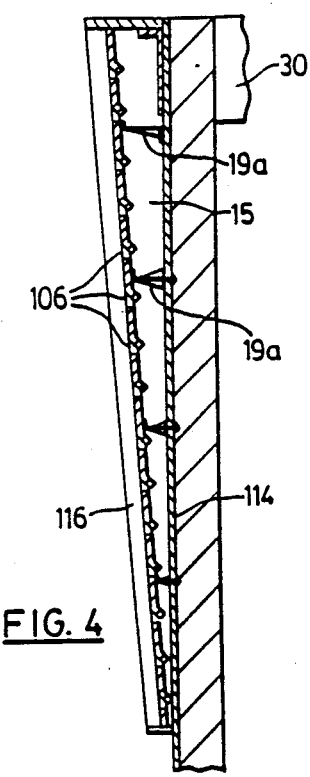
FIG. 4 is a vertical sectional view through a third embodiment of this invention.

FIG. 4 shows a vertical sectional view of yet another embodiment of the invention. The corrugated panel 116 is spaced at some distance from the wall or the wall mounting plate 114 near the top of the panel, while being closer to the wall at the bottom. Identical air inlet opening holes 106 are punched into the panel 116 in the grooves 120 as seen in the enlarged view of the panel 116 in FIG. 4a.

Figure 4A:
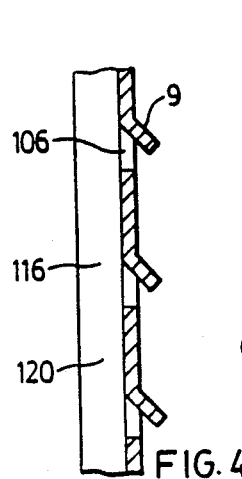
FIG. 4a is an enlarged view of a portion of FIG. 4.

Suitable support brackets 19a are used where fastening is required. The inlet opening holes 106 can be punched on site from the outside. The material of the holes is not punched out, but is rather displaced as shown in FIG. 4a, in order to strengthen the rim 9 of the hole and thus maintain the original strength of the corrugated panel. If the holes, instead of being punched, are produced by a thermal melting method (similar to welding or supersonic heating), the hole material will form a preferred heavy rim framing the hole.

Figure 5:
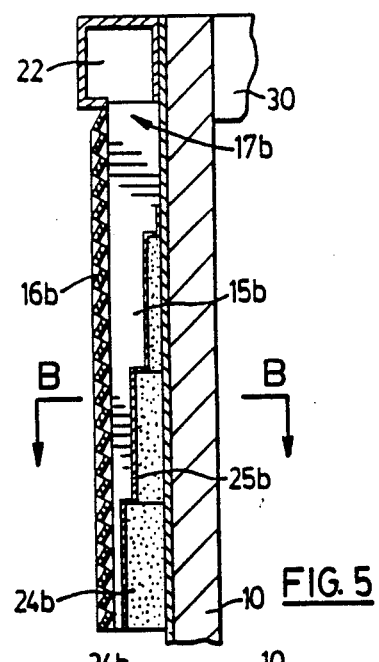
FIG. 5 is a vertical sectional view taken through a fourth embodiment of this invention.
Figures 6, 6A, 6B:
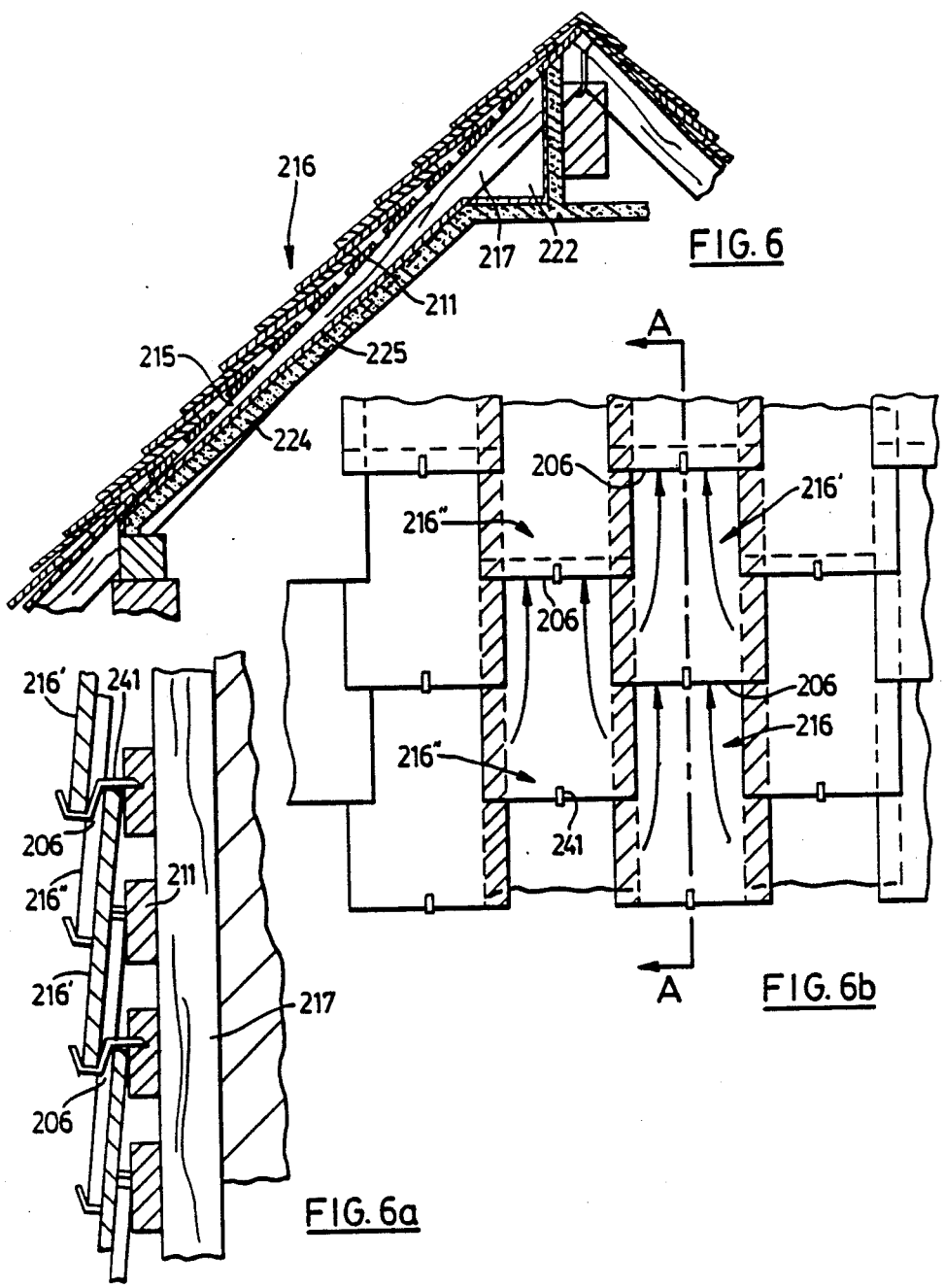

FIGS. 1 to 4 present facade constructions for ventilation air heating systems which, as embodiments of this invention, are particularly suitable for industrial and commercial buildings. The invention, however, is just as attractive for single family dwellings and apartment houses. FIGS. 5 and 6 show facade designs which appear particularly acceptable in home building.

Figure 5A:
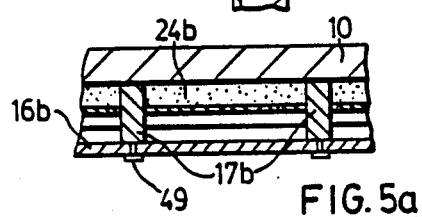
FIG. 5a is a horizontal sectional view taken at the line B—B in FIG. 5.

FIG. 5 shows a vertical section through a further embodiment of the invention which consists of a vertical flat panel 16b made of expanded metal sheet with a dark outside house coloring. For architectural reasons, the panel 16b is built up of small sub-panels, each attached to and supported by vertical support-walls 17b as shown in the horizontal sectional view of FIG. 5a, taken at the line B—B in FIG. 5.

Figure 5B:
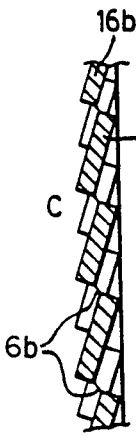
FIG. 5b is a vertical sectional view, to a larger scale, of one portion of the embodiment shown in FIG. 5.
Figure 5C:
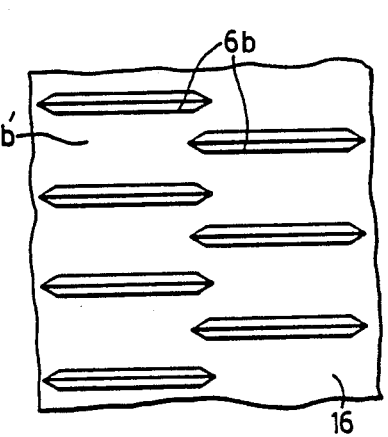
FIG. 5c is an elevational view of the same portion as is shown in FIG. 5b.

FIGS. 5b and 5c are an enlargement of the panel 16b of FIG. 5, and an elevational view of the panel, respectively. The air inlet openings 6b consist of the slits cut into the metal sheet 16b by the conventional metal expanding punch press. The flat metal sheet is broken up into a succession of nearly overlapping miniature sub-panels 16b', each row interstitial to the next, creating an attractive image for a house facade.

The air collection space 15b behind the panel 16b has a cross-section which decreases from the plenum 22 toward the bottom, by virtue of thermal insulation layers 24b increasing in thickness. The insulation layers are enclosed in a thin metal film 25b.

FIG. 6 is a sectional view of another embodiment of the invention, showing a "porous" solar collector panel acceptable as a facade for domestic housing. The panel 216 is made up of a plurality of overlapping small sub-panels 216', 216'', etc. shown enlarged in FIG. 6a. The two Figures indicate that the construction of the panel is applicable as a roof covering as well as a south-wall facade. Rafters 217 and boards 211 serve to support the sub-panels 216', 216'', etc. The thickness of the individual panel determines the height of the air inlet openings 206. The overlap on the sides of the sub-panels limits the width of the openings. FIG. 6b is an elevational view of the panel 216, and indicates the heated air flow to the air inlet openings 206. From the openings 206, the air flows to the plenum 222 through the air collection channels 215, in part defined by ducting material 225 covering the thermal insulation 224 of the attic room and the rafters 217.

The sub-panels may be made of a large variety of materials such as ceramic tiles, roofing or siding shingles, metal tiles with a selective coating of desired coloring, glass plates with photovoltaic evaporated films or other types of photovoltaic electric panels etc.

The use of photovoltaic panels as collector panels 16 in accordance with this invention is of particular interest for the future. Photovoltaic cells operate well under a temperature of 30° C. and with decreasing efficiency at higher temperatures. They need to be cooled for best performance in summer. Using water as a cooling agent leads to expensive constructions. Using ventilation air for photovoltaic cell cooling in accordance with this embodiment of the invention satisfies both requirements without additional cost. FIGS. 6–6b show that the inlet airflow provides a very efficient heat transfer from the panels 216 to the air. The panels are secured by fastening means 241 which may be used in addition as electrical contacts.

Figure 6C:
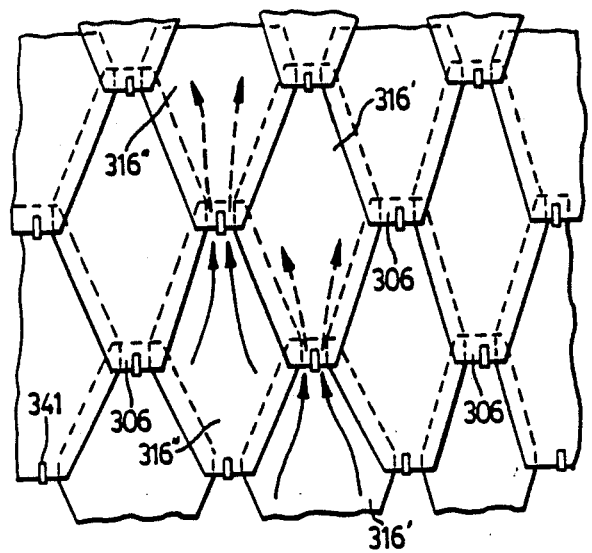
FIG. 6c is an elevational view similar to FIG. 6b, showing an alternative embodiment.

FIG. 6c shows an alternative tile construction to that illustrated in FIG. 6b. In FIG. 6c, the individual tiles are hexagonal and are identified by the numerals 316', 316'', etc. The air-intake openings are identified with by the numeral 306.

While several embodiments of this invention have been illustrated in the accompanying drawings and described hereinabove, those skilled in the art will appreciate that changes and modifications may be made therein without departing from the essence of this invention, as set forth in the appended claims.

The embodiments of the invention in which an exclusive property or privilege is claimed are defined as follows:

1. A method of preheating ventilation air for a building having a south-facing surface through which heat from the interior of the building escapes, the method comprising the steps:

(a) providing on the south-facing surface of the building a solar radiation-absorbent collector panel defining an air collection space between itself and said surface, the panel being constructed of expanded metal sheet and having, distributed over the panel, a plurality of air inlet openings communicating with said air collection space, the panel being exposed to the ambience, the air inlet openings being constituted by slits in the expanded metal;

(b) heating outside air with solar heat from the collector panel and with heat being lost from the interior of the building, and passing the heated air upwardly in laminar flow along the panel; and (c) withdrawing heated outside air through the air inlet openings of the collector panel and into the air collection space behind the panel, using air-moving means having an inlet at the top of the air collection space and having an outlet within the interior of the building, the air-moving means establishing a negative pressure differential across the collector panel with respect to the ambience.

2. A method of preheating ventilation air for a building having a south-facing surface through which heat from the interior of the building escapes, the method comprising the steps:

(a) providing on the south-facing surface of the building a solar radiation-absorbent collector panel defining an air collection space between itself and said surface, the collector panel being constructed of a plurality of substantially identical and overlapping sub-panels, and having, distributed over the panel, a plurality of air inlet openings communicating with said air collection space, the panel being exposed to the ambience, the air inlet openings being formed by spaces left open between the overlapping sub-panels;

(b) heating outside air with solar heat from the collector panel and with heat being lost from the interior of the building, and passing the heated air upwardly in laminar flow along the panel; and (c) withdrawing heated outside air through the air inlet openings of the collector panel and into the air collection space behind the panel, using air-moving means having an inlet at the top of the air collection space and having an outlet within the interior of the building, the air-moving means establishing a negative pressure differential across the collector panel with respect to the ambience.

3. The method claimed in claim 2 in which the overlapping sub-panels are photovoltaic panels.

4. A method of preheating ventilation air for a building having a south-facing surface through which heat from the interior of the building escapes, the method comprising the steps:

(a) providing on the south-facing surface of the building a solar radiation-absorbent collector panel defining an air collection space between itself and said surface, and having, distributed over the panel, a plurality of air inlet openings communicating with said air collection space, the panel being exposed to the ambience;

(b) heating outside air with solar heat from the collector panel and with heat being lost from the interior of the building, and passing the heated air upwardly in laminar flow along the panel; and (c) withdrawing heated outside air through the air inlet openings of the collector panel and into the air collection space behind the panel, using air-moving means having an inlet at the top of the air collection space and having an outlet within the interior of the building, the air-moving means establishing a negative pressure differential across the collector panel with respect to the ambience, the area of the air inlet openings per unit collector panel area increasing with increasing distance from the air-moving means.

5. A method of preheating ventilation air for a building having a south-facing surface through which heat from the interior of the building escapes, the method comprising the steps:

(a) providing on the south-facing surface of the building a solar radiation-absorbent collector panel defining an air collection space between itself and said surface, said air collection space being subdivided by suitable walls into a plurality of parallel channels, the panel having, distributed over the panel, a plurality of air inlet openings communicating with said air collection space, the panel being exposed to the ambience;

(b) heating outside air with solar heat from the collector panel and with heat being lost from the interior of the building, and passing the heated air upwardly in laminar flow along the panel; and (c) withdrawing heated outside air through the air inlet openings of the collector panel and into the air collection space behind the panel, using air-moving means having an inlet at the top of the air collection space and having an outlet within the interior of the building, the air-moving means establishing a negative pressure differential across the collector panel with respect to the ambience.

6. An apparatus for preheating ventilation air for a building having a south-facing surface through which heat from the interior of the building escapes, comprising:

a sunlight-absorbent collector panel on the south facing surface, the panel defining an air collection space between itself and the surface, and being exposed to the ambience, the panel being constructed of expanded metal sheet and being provided with a plurality of air inlet openings formed by slits in the expanded metal and distributed over the panel, the openings communicating with said space between the panel and the surface, and air-moving means having at the top of the panel an inlet which communicates with the air collection space between the panel and the wall for receiving air that has been heated during upward passage and drawn in through the plurality of air inlet openings, and having an outlet within the interior of the building, the air-moving means being adapted to establish a negative pressure differential across the collector panel with respect to the ambience.

7. An apparatus for preheating ventilation air for a building having a south-facing surface through which heat from the interior of the building escapes, comprising:

a sunlight-absorbent collector panel on the south facing surface, the panel defining an air collection space between itself and the surface, and being exposed to the ambience, the panel being provided with a plurality of air inlet openings distributed over the panel, and communicating with said space between the panel and the surface, the panel being constructed of a plurality of substantially identical and overlapping sub-panels, wherein the air inlet openings are formed by spaces left open between the overlapping sub-panels, and air-moving means having at the top of the panel an inlet which communicates with the air collection space between the panel and the wall for receiving air that has been heated during upward passage and drawn in through the plurality of air inlet openings, and having an outlet within the interior of the building, the air-moving means being adapted to establish a negative pressure differential across the collector panel with respect to the ambience.

8. The apparatus claimed in claim 7 in which the overlapping sub-panels are photovoltaic panels.

9. An apparatus for preheating ventilation air for a building having a south-facing surface through which heat from the interior of the building escapes, comprising:
- a sunlight-absorbent collector panel on the south facing surface, the panel defining an air collection space between itself and the surface, and being exposed to the ambience, the panel being provided with a plurality of air inlet openings distributed over the panel, the openings communicating with said space between the panel and the surface, and
- air-moving means having at the top of the panel an inlet which communicates with the air collection space between the panel and the wall for receiving air that has been heated during upward passage and drawn in through the plurality of air inlet openings, and having an outlet within the interior of the building, the air-moving means being adapted to establish a negative pressure differential across the collector panel with respect to the ambience, the area of the air inlet openings per unit collector panel area increasing with increasing distance from the air-moving means.

10. An apparatus for preheating ventilation air for a building having a south-facing surface through which heat from the interior of the building escapes, comprising:
- a sunlight-absorbent collector panel on the south facing surface, the panel defining an air collection space between itself and the surface, and being exposed to the ambience, the panel being constructed of expanded metal sheet and being provided with a plurality of air inlet openings formed by slits in the expanded metal and distributed over the panel, the openings communicating with said space between the panel and the surface, the collection space between the collector panel and the surface being sub-divided by suitable walls into a plurality of parallel channels, and
- air-moving means having at the top of the panel an inlet which communicates with the air collection space between the panel and the wall for receiving air that has been heated during upward passage and drawn in through the plurality of air inlet openings, and having an outlet within the interior of the building, the air-moving means being adapted to establish a negative pressure differential across the collector panel with respect to the ambience.

* * * * *